2 Sheets--Sheet 1.
T. BRANIGAN.
Boot-Trees.
No. 144,312. Patented Nov. 4, 1873.
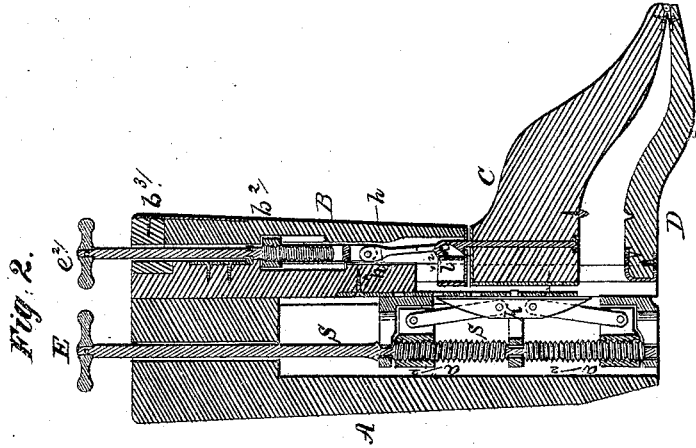
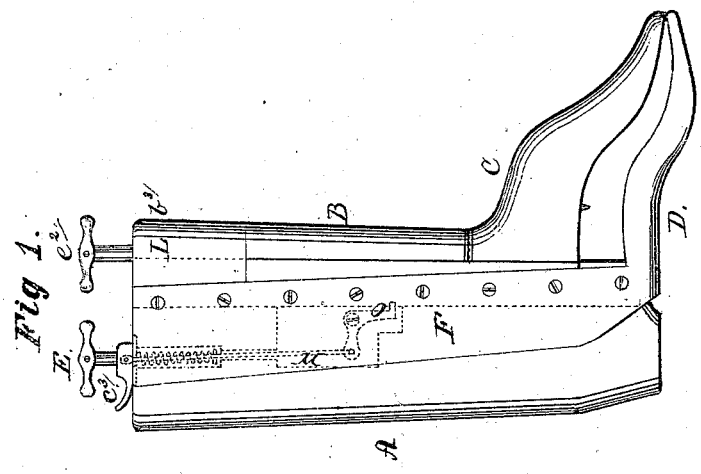
Witnesses
Inventor
Thomas Branigan T. BRANIGAN.
Boot-Trees.
No. 144,312.
2 Sheets--Sheet 2.
Patented Nov. 4, 1873.
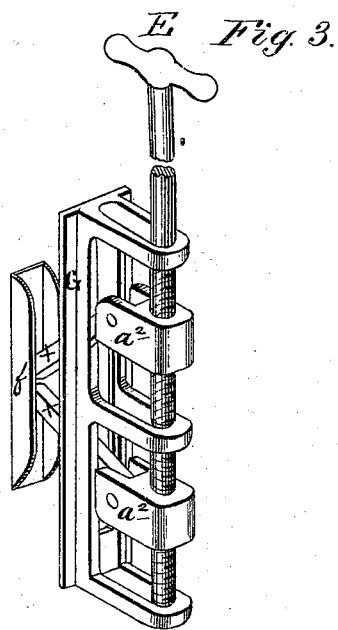
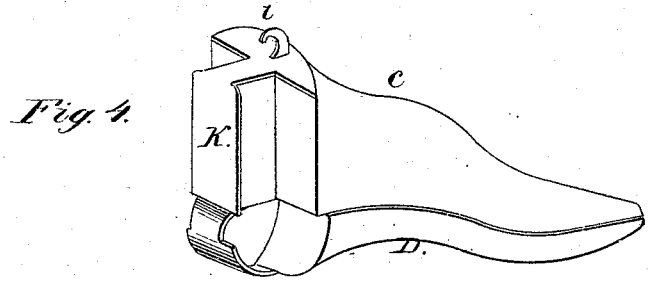
Witnesses.
D. Johnson
J. S. Wright
Inventor:
Thomas Branigan

UNITED STATES PATENT OFFICE.

THOMAS BRANIGAN, OF BELOIT, WISCONSIN.

IMPROVEMENT IN BOOT-TREES.

Specification forming part of Letters Patent No. 144,312, dated November 4, 1873; application filed October 4, 1873.

*To all whom it may concern:*

Be it known that I, THOMAS BRANIGAN, of the city of Beloit, Rock county, in the State of Wisconsin, have invented certain new and useful Improvements in Boot-Trees; and I do hereby declare the following description and accompanying drawings, forming a part of this specification, are sufficient to enable any person skilled in the art or science to which it most nearly appertains to make and use my said invention or improvements without further invention or experiment.

The object of my invention is to provide the trade with a boot-tree at once simple of construction and perfect in application, whereby any part of the boot may be stretched as required without spoiling the shape or form. The foot or instep may be enlarged by raising the upper part of the last or foot of the tree vertically. The bottom or top of the boot-leg may be enlarged as required, or the whole leg may be spread out at the same time equally from top to bottom, as hereinafter particularly described.

In the drawings, Figure 1 is a perspective view of the tree complete with my improvements. Fig. 2 is a vertical plan section. Fig. 3 is a similar view of the stretching device placed in the rear of the tree, detached; and Fig. 4 is a plan view of the foot detached.

In the drawings similar letters of reference indicate corresponding parts.

It will be seen that by this invention the whole work of stretching or enlarging the foot or leg of a boot is accomplished by the proper manipulation of the vertical cross-headed screw-rods E and $e^2$, as hereinafter explained. By turning the screw-rod $e^2$, Fig. 2, to the left the sliding front B and upper part of the foot C will be carried down till the foot is closed, as in Fig. 4. The rod $e^2$ passes down through the solid or rigid part of the front $b^3$, covered by the metal cap L, shown at Fig. 1. Its lower end has a screw-thread working in the nut $b^2$, which nut has a strap on each side, allowing the screw to pass between them, said straps uniting at their lower ends and clasping a flat follower-piece, $h$; at its lower end provided with an elongated loop or slot, the upper end being embraced by the flat ends of straps pendent from the nut $b^2$ and loosely hinged between them. The slot of the part $h$ is intended to engage with the hook $i$ of the foot part C, as shown at Fig. 2. The rod $e^2$ is prevented from moving up or down in the tree by means of a shoulder engaging with an open nut, as seen a little above the nut $b^2$, Fig. 2. This strap $b^2$ traverses the length of the white line or space shown on the left-hand side of the strap-nut $b^2$, which is just sufficient to allow the foot C and front B of the tree to be drawn up, as shown at Fig. 2, and again screwed down till the foot is closed, as in Fig. 4. The white space for the nut $b^2$ on the sliding part of the front B should be but little more than the depth of said nut, for the reason that the function of said nut on its front side is to engage with a suitable groove cut in the said movable part of the front B. The rear part of the front B is merely a rigid frame-work for supporting the movable parts. When the slotted follower $h$ is let down so as to pass over the hook $i$, by turning the tree with the toe downward the loop will fall upon the hook $i$; then tighten the screw-rod $e^2$ by turning to the right, and the hook will be found firmly engaged with the follower $h$. The tree may then be handled in any way. The parts are disengaged by reversing this operation. The foot part C traverses a suitable groove in the rigid part of the front B, by means of the corresponding rabbet part K, shown at Fig. 4.

It will be seen that the instep or whole of the foot of the boot is enlarged or stretched by screwing up the front B and foot C by means of turning the screw-rod $e^2$ to the right. The action is perfect and uniform. The whole front being carried up together, there can be no wrinkle or unequal tension upon the leather.

The device connected with the screw-rod E is thus explained: In Fig. 2 the stretching device is shown at the bottom of the space S S, Fig. 2. Now, by turning the screw-rod E to the right, the right and left hand nuts $a^2$ upon the corresponding screw-threads of the rod E will be drawn toward each other, carrying with them the inner ends of the arms $x\ x$ pivoted to said nuts, and having their outer ends pivoted to the follower $f$. Now, by observing this device at Fig. 2 in its normal position, it will be seen that this operation must expand the whole foot and lower part of the boot-leg in the direction of the length of the foot. By lifting the point of the lever $c^3$, actuating the wire $w$, the spring-dog $o$ is disengaged, and the stretching device may then be drawn up to the top of the space S, by means of the rod E, after first removing the tension from the follower $f$ by turning the screw-rod E to the left. The boot-leg may in like manner be enlarged at the upper part, or in the same manner at any other part of the boot-leg. If the stretcher is placed exactly at the middle of the leg the whole length of the leg will be enlarged equally from top to bottom. This device is moved up and down in the tree by means of a cut-out or groove, in which the metal frame G slides, and is held at any desired point by means of the spring-dog $o$.

The parts A, B, C, and D are clasped on each side by the metal shell F, screwed to the rigid part of the front B, as shown.

When in use the whole tree is firmly held by the spring-dog $o$, so that neither the whole front or rear part can be moved up or down separately until the dog $o$ is disengaged by raising the lever $c^3$, as shown in the drawing, Fig. 1.

Having thus explained my said invention, what I claim as new, and desire to secure by Letters Patent, is—

1. In a boot-tree, the sliding front B, rod $e^2$, nut $b^2$, follower $h$, and hook $i$, substantially as and for the purpose specified.

2. The combination of the sliding front B, foot part C and D, substantially as described.

3. The rod E, lever $c^3$, spring-dog $o$, skeleton frame G, nuts $a^2$, arms $x\ x$, and follower $f$, substantially as and for the purpose set forth.

4. The parts A, F, and S, in combination with the rod E, skeleton frame G, nuts $a^2$, arms $x\ x$, and follower $f$, substantially as specified.

THOMAS BRANIGAN.

Witnesses:
P. JOHNSON,
T. WRIGHT.